(12) United States Patent
Butts

(10) Patent No.: US 8,561,962 B1
(45) Date of Patent: Oct. 22, 2013

(54) VIBRATION MOUNT

(75) Inventor: Gary C. Butts, Huntington Beach, CA (US)

(73) Assignee: Labworks, Inc., Costa Mesa, CA (US)

( * ) Notice: Subject to any disclaimer, the term of this patent is extended or adjusted under 35 U.S.C. 154(b) by 336 days.

(21) Appl. No.: 12/942,843

(22) Filed: Nov. 9, 2010

(51) Int. Cl.
*F16M 1/00* (2006.01)
*F16F 5/00* (2006.01)

(52) U.S. Cl.
USPC ............... 248/638; 248/615; 267/141

(58) Field of Classification Search
USPC ............... 248/638, 676, 677, 560, 615, 634; 267/141, 141.1, 141.2
See application file for complete search history.

(56) References Cited

U.S. PATENT DOCUMENTS

| | | | | |
|---|---|---|---|---|
| 4,458,888 A * | 7/1984 | Wolf et al. | ............... | 267/140.12 |
| 8,132,773 B1 * | 3/2012 | Platus | ............... | 248/618 |
| 2003/0071187 A1 * | 4/2003 | Herren et al. | ............... | 248/638 |
| 2006/0131471 A1 * | 6/2006 | Sun et al. | ............... | 248/638 |
| 2007/0164492 A1 * | 7/2007 | Cook | ............... | 267/141 |
| 2011/0193278 A1 * | 8/2011 | Kobori | ............... | 267/141.1 |

* cited by examiner

*Primary Examiner* — Steven Marsh
(74) *Attorney, Agent, or Firm* — Blakely Sokoloff Taylor & Zafman LLP

(57) ABSTRACT

A vibration mount having a body for coupling to an object to be supported by the vibration mount, a flexible member forming a foot on the body and together with the body, forming a chamber therein, a center member within the chamber and coupled to move in unison with the body, a valve having a first valve member coupled to move in unison with the central member and a second valve member coupled to move in unison with the flexible member, a connection for coupling air under pressure to the chamber through the valve member, and a vent for venting the chamber though the valve. The valve couples air under pressure from the connection to the chamber when the first and second valve members are in a first relative position, couples air in the chamber to the vent when the first and second valve members are in a second position, and does not couple air under pressure from the connection to the chamber or couple air in the chamber to the vent when the first and second valve members are between the first and second positions.

11 Claims, 3 Drawing Sheets

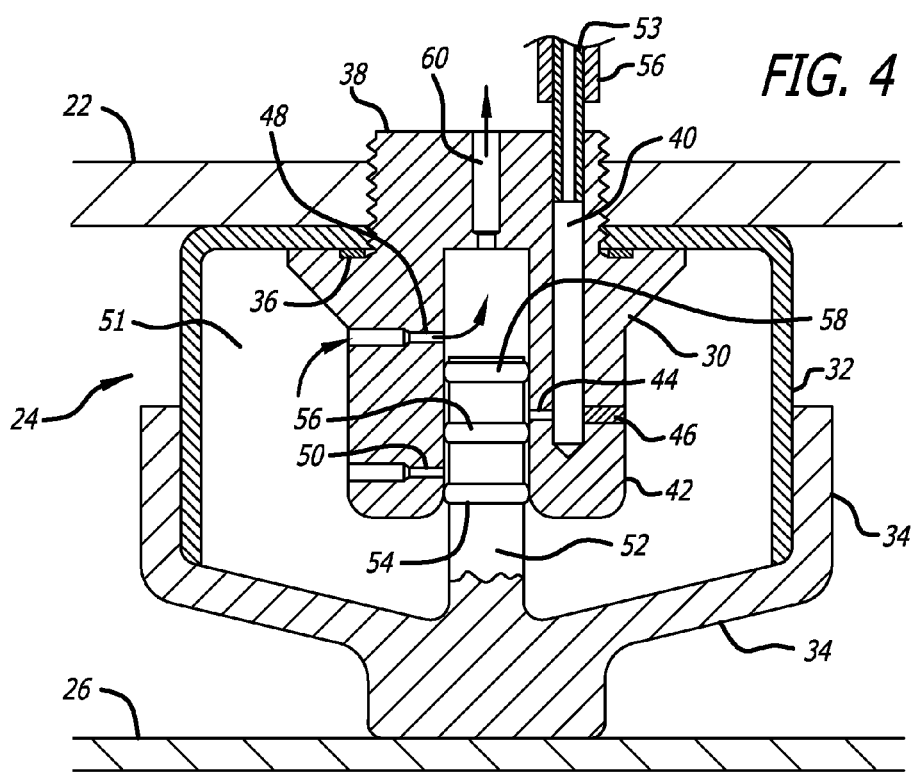
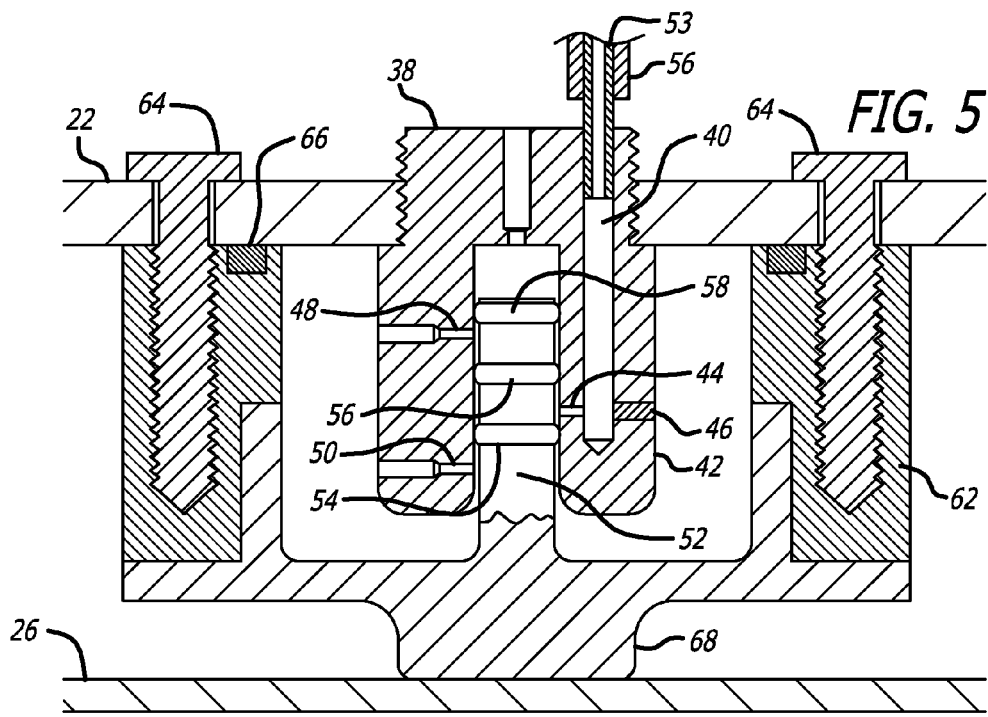

VIBRATION MOUNT

BACKGROUND OF THE INVENTION

1. Field of the Invention

The present invention relates to the field of vibration mounts.

2. Prior Art

The preferred embodiments of the present invention are intended for support of a shaker and attached test objects used to vibration test said objects, as well as general vibration isolation of structures as may be facilitated by low spring rate gas mounts, including but not limited to vibration testing in an environmental chamber.

Vibration mounts of various designs and for various purposes are well known in the prior art. In vibration mounts in general, it is desired to support a load with a low spring rate support to decouple the vibration of the load from the object the vibration mount is supported on, or to decouple the vibration of the object the vibration mount is supported on from the load, or in some cases to simply decouple the two vibration sources. Either way, the low spring rate is particularly important to isolate low frequency vibration, as the amplitude of a vibration of a given g level is inversely proportional to the frequency of the vibration. Static pressure air mounts are available for this purpose, with the inherent severe limitations of high static displacements and positional instability associated with the low spring rates and variable loading of these mounts. Any mount that reaches a limit of its travel in use, creates noise and injects higher frequencies and irregular vibrations, all counter to the purpose of the vibration mount. A simple, individually self leveling mount is desirable for many gas mount requirements. These requirements are not limited to vibration test, as they also apply to other applications as well, such as, by way of example, to isolate structures from floor or table borne vibrations as required by optical test benches.

In the case of the support of a shaker, various types of rubber mounts are used. Such mounts are satisfactory when resting on a rigid surface. However, because of the variation in the weight of various objects being tested, the combined weight of a object being tested and the shaker can vary significantly. Consequently, prior art vibration mounts for shakers tend to be somewhat stiff so as to not bottom out, so to speak, when testing heavy objects at low frequencies.

In one specific application, the floor panel in environmental test chambers is in general not rigid. In particular, the floor panel may be supported only along its edges, or if additional supports are provided, such supports are generally so limited as to not provide a rigid floor in other areas of the environmental chamber floor. Consequently, when a shaker is used in an environmental chamber with prior art vibration mounts, such as four mounts in a square pattern, one or more of those mounts will support the shaker more rigidly than the others. This has an adverse affect on the performance of the shaker, in that the support of the shaker is effectively displaced toward the more rigidly supported vibration mounts, injecting unintentional transverse vibration and rotational vibration perpendicular to axis the axis of the shaker, in addition to the intended linear vibration of the item under test along the axis of the shaker.

BRIEF DESCRIPTION OF THE DRAWINGS

FIG. 4 is a cross section of the vibration mount of FIG. 1 when the vibration mount is pressurized more than needed.

FIG. 5 is a cross section of an alternate embodiment of vibration mount when coupled to a source of air under pressure.

DETAILED DESCRIPTION OF THE PREFERRED EMBODIMENTS

Figure 1:
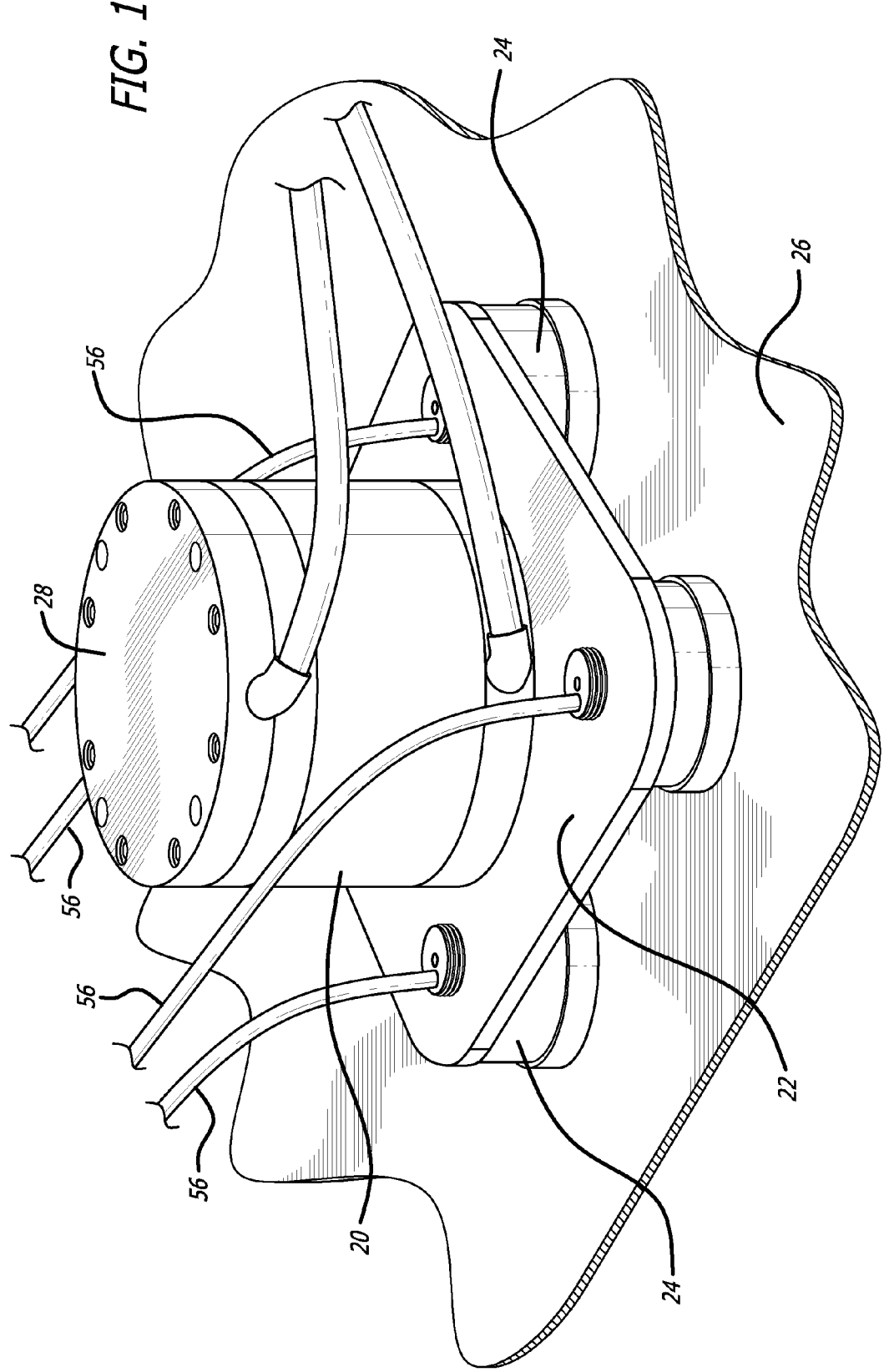
FIG. 1 illustrates an embodiment of the present invention vibration mount in an exemplary application of supporting a shaker.

First referring to FIG. 1, a shaker 20 mounted on a plate 22 supported by vibration mounts 24 supported by floor 26 of an environmental chamber may be seen. In a typical vibration test type of isolation mount application, a shaker is a substantially symmetrical device having a table 28 with threaded bolt holes therein to be used to clamp down an object to be tested, generally with the center of gravity of the object to be tested aligned with the center of the shaker.

Figure 2:
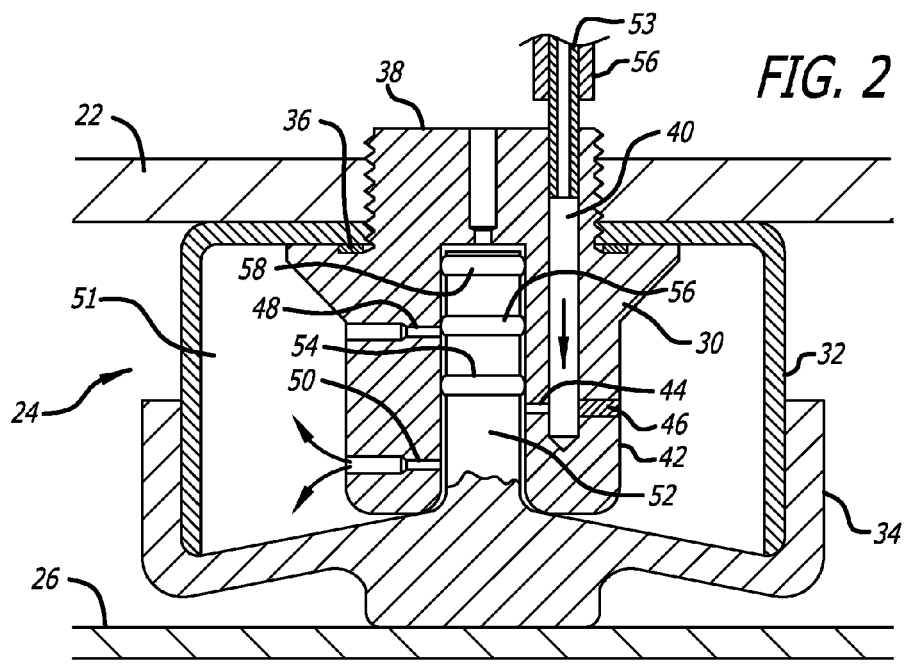
FIG. 2 is a cross section of the vibration mount of FIG. 1 when not coupled to a source of air under pressure.
Figure 3:
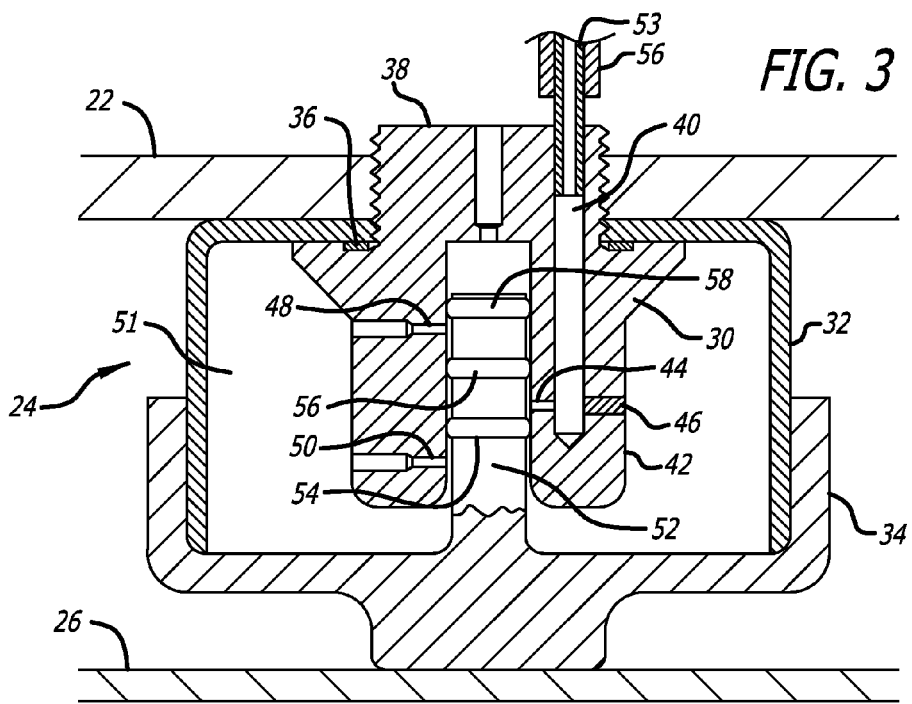
FIG. 3 is a cross section of the vibration mount of FIG. 1 when coupled to a source of air under pressure.

In FIG. 1, the vibration mounts 24 are in accordance with one embodiment of the present invention, illustrated in more detail in FIGS. 2 through 4. In this embodiment, the vibration mount 24 is comprised of a center member 30, an inverted cup member 32 form in the vibration mount body and a molded flexible or flexible member 34, in a preferred embodiment a molded silicon rubber member. Member 34 seals with respect to the inverted cup member 32, with a rubber gasket 36 sealing between center member 30 and the cup member 32. The center member 30 has a threaded upper portion 38 which threads into plate 26 (FIG. 1), though if desired, a lock nut may be threaded over the upper portion 38 to provide additional support.

The center member 30 has a hole 40 through the top thereof which extends into the lower portion 42 of the center member 30, with a hole 44 coupling the hole 40 through the inside wall of the center of the center member. Hole 44 is drilled through the entire wall of the center member 30, with the hole between hole 40 and the outer diameter of the center member 30 being plugged by plug 46. There are also two additional holes 48 and 50 spaced at different vertical elevations from hole 44 that merely couple the chamber 51 to the inside of the center member 30. Finally, a rigid (metal) tube 53 is pressed into hole 40 in the center member 30, with flexible tubing 56 (see also FIG. 1) being pressed over the rigid tube 53 and coupled to a supply of air under pressure (not shown).

Referring again to FIG. 2, when flexible tube 50 is vented, the weight of the shaker 20 and any item to be tested fastened thereto will cause the middle of flexible member 34 to collapse, or be pushed upward, typically ultimately engaging the bottom of center member 30. In this condition, air is free to flow out of chamber 51 through holes 44 and 40, and ultimately out through flexible tube 56, so the pressure in chamber 51 will be basically atmospheric pressure. The center 52 of flexible member 34 extends upward into the inner diameter of center member 30 and has three O-ring like members 54, 56 and 58 (hereinafter simply referred to as O-rings) integrally molded thereon that slip fit into the inner diameter of center member 30 and seal with respect thereto. Thus when flexible tube 56 is vented to the atmosphere, that pressure will be coupled through holes 40 and 42 to chamber 51 so that chamber 51 will be at atmospheric pressure.

When air under pressure is supplied through flexible tubing 56 as shown in FIG. 2, that pressurized air will be coupled through holes 40 and 44 and through the gap between the lower part of the center 52 of the flexible member 34 and center member 30 to provide air under pressure to chamber 51. This increased air pressure acting on the bottom of flexible member 34 forces the same downward as shown in FIG. 3, effectively lifting inverted cup member 32, mounting plate 26 and the shaker and test object mounted thereon upward until the lower O-ring 54 extends past hole 44, at which point further air flow into chamber 51 is prevented. Note that in this condition the pressure in chamber 51 is not equal to the pressure in flexible tube 56, but rather is that pressure required to lift plate 26 and the shaker from the position in FIG. 2 to that shown in FIG. 3. Consequently, chamber 51 provides an air spring which will allow plate 26 to vibrate up and down with the center 52 of the flexible member 34 sliding up and down in the middle portion of center member 30.

If for some reason more air enters chamber 51 than is needed to support plate 26 and the shaker or the test load weight is reduced, flexible member 34 will deflect further, opening a flow passage from chamber 51 through holes 48 and 60 to vent the excess air (higher pressure air than is needed). Of course when the shaker is on, plate 26 will be vibrating up and down, which vibration at low frequencies can have a substantial amplitude. If during that vibration, O-ring 54 momentarily extends above hole 44, as shown in FIG. 2, a spurt of additional air will enter chamber 51 to slightly raise plate 26 and the shaker. Conversely if during the vibration of plate 26, O-ring 58 momentarily extends below hole 48 as shown in FIG. 4, a spurt of air from chamber 51 will be vented through holes 48 and 60. Thus plate 26 will find a level where the air pressure in chamber 51 just supports the plate and shaker with no average change in the air pressure in chamber 51. Actually the same is also true if the vibration mount goes beyond the limits of its intended motion shown in FIGS. 2 and 4, with the support of the vibration mount only becoming substantially nonlinear when the vibration mount reaches a mechanical limit on its motion, either in its upper motion or in its lower motion.

It should noted from FIG. 2 that hole 50 provides a flow path into chamber 51 when the center member 38 is resting on the flexible member 34. Alternatively, the inner face of the flexible member 34 that the center member rests on could be molded with one or more channels therein to complete the flow path from hole 44 to chamber 51 when the center member 38 is resting on the flexible member 34. This would automatically provide the required flow path as part of the molding of the flexible member 34 and eliminate the need for the separate drilling operation to form hole 50.

Now referring to FIG. 5, an alternate embodiment of the vibration mount of the present invention may be seen. This vibration mount uses a housing 62 fastened to plate 26 by screws 64 and sealed with respect thereto by O-ring 66 for the vibration mount body (in the prior embodiment, the inverted cup member 32 was fastened to plate 22 by the center member 30). The housing 62 has a flexible member 68 attached to the bottom thereof which functions the same as flexible member 34 of the prior embodiment. Otherwise, the other members of the embodiment of FIG. 5 may be identical to those of the embodiments of FIGS. 1 through 4, and accordingly, have been given the same identification numerals. Thus the vibration mount of the present invention, when provided with a source of air of adequate pressure, will seek its own operating level and readjust as required, such as by the extent of linear vibration it encounters and/or by the addition or removal of weight supported by the vibration mount.

The common aspect of these and other embodiments of the present invention is the flexible members 34 and 68 enclosing a lower part of a chamber, which flexible members form a foot for the vibration mount and have ample freedom to deflect vertically to support whatever is mounted on the vibration mount when coupled to a source of air under adequate pressure, and which incorporate a valve member that cooperates with a mating valve member which moves with whatever is supported by the vibration mount to couple additional air to the chamber when needed and to vent excess air from the chamber, also when need be. The preferred form of valve is a form of spool valve as illustrated in drawings and as described herein.

Accordingly, the present invention vibration mounts will provide a low spring rate support for a load to decouple the vibration of the load from the object the vibration mount is supported on, or to decouple the vibration of the object the vibration mount is supported on from the load, or in some cases to simply decouple the two vibration sources. They will also automatically seek their proper operating level regardless of the load and vibration excursion within their range of travel.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A vibration mount comprising:
    a body for coupling to an object to be supported by the vibration mount;
    a flexible member forming a foot on the body and together with the body, forming a chamber therein;
    a center member extending within the chamber and coupled to move in unison with the body;
    a valve having a first valve member coupled to move in unison with the center member and a second valve member coupled to move in unison with the flexible member;
    a connection for coupling air under pressure to the chamber through the valve; and,
    a vent for venting the chamber though the valve;
    the valve coupling air under pressure from the connection to the chamber when the first and second valve members are in a first relative position, to couple air in the chamber to the vent when the first and second valve members are in a second position, and to not couple air under pressure from the connection to the chamber or couple air in the chamber to the vent when the first and second valve members are between the first and second positions.

2. The vibration mount of claim 1 wherein the valve is a spool valve having a spool valve housing and a spool.

3. The vibration mount of claim 2 wherein the center member is the valve housing and an upward projection on the flexible member is the spool.

4. The vibration mount of claim 3 wherein the center member has a generally cylindrical opening extending upward from a lower end thereof, and wherein the upward projection on the flexible member extends into the generally cylindrical opening and has seal rings thereon to seal against the generally cylindrical opening, the center member having holes therein to couple air under pressure from the connection to the chamber, to couple air in the chamber to the vent, or to not couple air under pressure from the connection to the chamber or air in the chamber to the vent, depending on the position of the ring seals with respect to the holes in the center member.

5. The vibration mount of claim 4 wherein the upward projection on the flexible member has three seal rings thereon distributed along it height, and the center member has at least two holes through an inner diameter of the generally cylindrical opening, the first hole defining a flow path from the connection for coupling air under pressure to the chamber when the upward projection is in its most upward position with respect to the center member, the third seal ring opening a flow path between the chamber and the vent when the upward projection is above the range of normal operating positions with respect to the center member, and the first seal ring blocking the connection for coupling air under pressure to the chamber through the first hole, the second seal ring blocking flow from the connection for coupling air under pressure to the chamber through the second hole and the third seal ring blocking the flow path between the chamber and the vent when the upward projection is in a range of normal operating positions with respect to the center member.

6. The vibration mount of claim 1 wherein the flexible member is a molded silicone rubber flexible member.

7. The vibration mount of claim 6 wherein the valve is a spool valve having a spool valve housing and a spool, the center member being the valve housing and an upward projection on the flexible member being the spool, the upward projection on the flexible member being integrally molded thereon.

8. A vibration mount comprising:
   a body;
   a flexible member forming a foot on the body and together with the body, forming a chamber therein;
   a center member within the chamber and coupled to the body to move in unison with the body, the body and center member for coupling to an object to be supported by the vibration mount and to move in unison therewith;
   the center member defining a spool valve body;
   the flexible member having an upward projection integrally molded thereon forming a spool fitting within the spool valve body to form a spool valve;
   a connection for coupling air under pressure to the spool valve body; and,
   a vent for venting the chamber though the center member;
   the spool valve coupling air under pressure from the connection to the chamber when the spool and spool valve body are in a first relative position, coupling air in the chamber to the vent when the spool and spool valve body are in a second relative position, and to not couple air under pressure from the connection to the chamber or couple air in the chamber to the vent when the spool and spool valve body are between the first and second relative positions.

9. The vibration mount of claim 8 wherein the center member has a generally cylindrical opening extending upward from a lower end thereof, and wherein the upward projection on the flexible member extends into the generally cylindrical opening and has seal rings integrally thereon to seal against the generally cylindrical opening, the center member having holes therein to couple air under pressure from the connection to the chamber, to couple air in the chamber to the vent or not couple air in the chamber to the vent depending on the position of the ring seals with respect to the holes in the center member.

10. The vibration mount of claim 9 wherein the upward projection on the flexible member has three seal rings thereon distributed along it height, and the center member has at least two holes through an inner diameter of the generally cylindrical opening, the first hole defining a flow path from the connection for coupling air under pressure to the chamber when the upward projection is in its most upward position with respect to the center member, the third seal ring opening a flow path between the chamber and the vent when the upward projection is above the range of normal operating positions with respect to the center member, and the first seal ring blocking the connection for coupling air under pressure to the chamber through the first hole, the second seal ring blocking flow from the connection for coupling air under pressure to the chamber through the second hole and the third seal ring blocking the flow path between the chamber and the vent when the upward projection is in a range of normal operating positions with respect to the center member.

11. The vibration mount of claim 10 wherein the flexible member, upward projection and the seal rings are a molded silicone rubber flexible member.

* * * * *